United States Patent [19]

Sevald

[11] 4,159,065

[45] Jun. 26, 1979

[54] APPARATUS FOR ORIENTING AND DISPENSING ARTICLES

[75] Inventor: Paul E. Sevald, Rodovre, Denmark

[73] Assignee: Aktieselskabet Laur. Knudsen Nordisk Elektricitets Selskab, Copenhagen, Denmark

[21] Appl. No.: 843,511

[22] Filed: Oct. 19, 1977

[30] Foreign Application Priority Data

Nov. 2, 1976 [GB] United Kingdom ............... 45402/76

[51] Int. Cl.$^2$ .......................... B23Q 7/12; B65H 9/00
[52] U.S. Cl. ...................................... 221/167; 221/186
[58] Field of Search ................ 221/156, 157, 163–165, 221/167, 171, 173, 186; 198/389, 392, 396, 778

[56] References Cited

U.S. PATENT DOCUMENTS

| | | | |
|---|---|---|---|
| 1,722,849 | 7/1929 | Luse | 221/186 |
| 2,263,858 | 11/1941 | Borge | 221/167 |
| 2,916,188 | 12/1959 | Springate | 221/163 |

Primary Examiner—Robert J. Spar
Assistant Examiner—H. Grant Skaggs
Attorney, Agent, or Firm—Watson, Cole, Grindle & Watson

[57] ABSTRACT

An apparatus for dispensing articles oriented in a predetermined way and comprising a cylindrical container for accommodating the articles to be oriented and dispensed, a spiral formed groove or slot being provided in the bottom of the container and extending from the outer area of the bottom to the center of the bottom at which the groove or slot merges into a hole having a diameter which is greater than the width of the groove or slot, a chute is connected to the hole for acommodating articles fed to the hole by the groove or slot and guiding the articles to a working station, the cylindrical container is supported by a frame for rotation about an inclined axis and a motor is connected to the container for rotating the container about the inclined axis.

4 Claims, 3 Drawing Figures

APPARATUS FOR ORIENTING AND DISPENSING ARTICLES

BACKGROUND OF THE INVENTION

In processes of manufacturing where various parts are assembled to form the final product the task of assembly is greatly assisted if the individual parts arrive at the place of assembly properly oriented with respect to each other. In case of automatic assembly this is practically a must.

Apparatuses are known which are capable of orienting parts or articles of an assembly that arrive at the apparatus with random orientation. One of the most frequently used apparatuses for this prupose consists of a vertical cylinder accomodating the randomly oriented articles and which as a whole is brought to vibrate in such a manner that the articles tend to move along circular paths concentric with the cylinder. A spiral formed ramp along the inner periphery of the cylinder guides some of the articles to ascend the ramp, propelled by the vibrations, and by various means those articles that are not properly oriented are rejected before they reach the top of the ramp.

One of the drawbacks of this device is due to the vibrations which tend to produce obnoxious noice in the audible spectrum, and the production of these vibrations also requires a significant amount of energy.

One of the objects of the invention is to perform the task of orientation of the articles without the use of vibrations as propellant. Another object is to reduce the amount of energy needed.

SUMMARY OF THE INVENTION

According to the invention an apparatus for orienting and dispensing articles is provided comprising a container for accomodating the articles to be oriented and dispensed, said container comprising a bottom wall wherein groove or slot means are provided, said groove or slot means extending from the outer circumferential area of the bottom wall and to the center area of the bottom wall and being curved so that the radii of curvature of said groove or slot means decrease in direction from said outer area to said center area, an aperture being provided in said bottom wall at the center area thereof, said aperture having a width greater than the width of said groove or slot means, said groove or slot means being in communication with said aperture and chute means being connected to said aperture so as to receive articles fed by said groove or slot means to said aperture, and to guide said articles to a working station, said container being supported by bearing means for rotation of said container bottom wall about an axis which includes a acute angle with respect to the vertical direction and driving means for unidirectionally rotating said container about said axis. By means of the present invention the drawbacks referred to above are avoided due to the fact that the articles accomodated in the container, by the rotation of the container will be caught by the groove or slot means and will be transported to the aperture almost according to the same principles as the transportation achieved by means of an archimedean screw and from the aperture of the articles will by gravity be transferred with their orientation maintained, to the working station. Accordingly, vibrations and the drawbacks connected therewith are avoided.

DESCRIPTION OF THE PREFERRED EMBODIMENT

Figure 1:
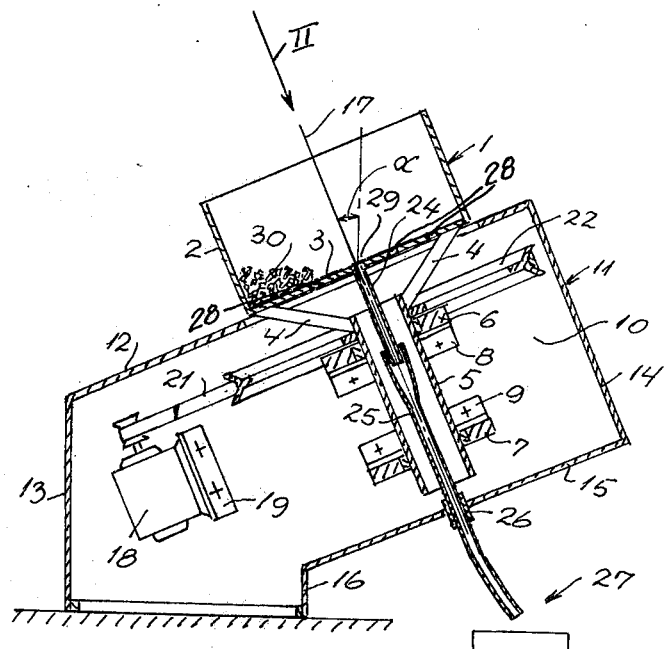
FIG. 1 shows a side view of a vertical section through a preferred embodiment of the apparatus according to the invention.

On the drawing, 1 is a container comprising a cylindrical side wall 2 and a flat circular bottom wall 3. By means of spider arms 4 the container 1 is connected to a hollow shaft 5 journalled in bearings 6 and 7 which are secured to brackets 8 and 9, respectively. The brackets 8,9 are secured to a side wall 10 of a housing 11 of the apparatus. The housing 11 moreover comprises a top wall 12, a vertical rear wall 12, an inclined front wall 14, an inclined bottom wall 15 and a vertical wall 16. In direction towards the viewer the housing is closed by means of a side wall opposite the side wall 10. The axis of symmetry 17 of the container and accordingly the axis about which the container 1 and the hollow shaft 5 may be rotated owing to the bearings 6 and 7 is inclined with respect to the vertical direction seeing that the axis 17 together with the vertical direction includes an angle $\alpha$ of approximately 23°. In the housing, moreover, a motor 18 is arranged secured to a bracket 19 which is also supported by the side wall 10 of the housing. The motor 18 is by means of a belt 21 connected to a pulley 22 secured to the hollow shaft 5. Accordingly, the motor 18 may via the belt 21 rotate the container 1 unidirectionally about the axis 17.

At the center of the bottom wall 3 of the container a short guiding tube 24 is secured. The lower end of the tube 24 extends into the upper end of a stationary guiding tube 25 which by means of a sleeve 26 is supported with respect to the bottom wall 15 of the housing 11. A small gap (not shown on the drawing) is provided between the lower end of the tube 24 and the upper end of the tube 25 in order to permit the tube 24 to rotate with respect to the stationary tube 25. The two tubes 24 and 25 form a chute means through which articles may be fed by gravity so as to be conducted to a working station generally indicated by 27.

Figure 2:
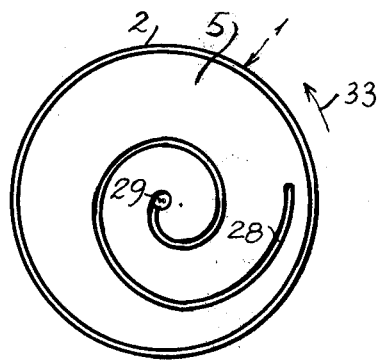
FIG. 2 shows a top view of a container of the apparatus as seen in the direction of the arrow II in FIG. 1.

In FIG. 2, the container 1 is seen in direction of the arrow 2 in FIG. 1 and, accordingly, in the direction of the axis 17. In the bottom wall 3 of the cylinder 1 a guiding slot or groove 28 is provided which extends in a spiral like form from the outer area of the bottom wall 3 and to the center area of the bottom wall wherein an aperture 29 is provided which forms an extension of the cavity of the guiding tube 24. The slot or groove 28, accordingly, has decreasing radii of curvature from the outer area of the bottom wall 5 towards the center thereof.

The apparatus illustrated operates in the following way:

Articles to be oriented and dispensed by means of the apparatus are located in random orientation in a heap on the bottom wall 5 of the container as indicated by 30.

As an example of the articles to be oriented and dispensed by means of the apparatus cap-screws may be mentioned. One such screw 31 has been illustrated in FIG. 3 the stem 32 of which is accomodated in the slot 28.

When the container 1 by means of the motor 18 is rotated about its axis 17 in the direction of the arrow 33 in FIG. 2, the screws contained in the heap 30 will be carried along due to friction against the bottom and side walls 3,2 of the container 1 until the screws reach the point where gravity will cause them to slide down over the top surface of the bottom wall 3. During such sliding movement some of the articles will be caught in the slot 28 which is dimensioned so that it only permits the articles to lodge permanently in a desired orientation. In the example illustrated on the drawing the width of the slot 28 is such that the stem portion 32 only of the screws may be accomodated in the slot as shown in FIG. 3.

During the further rotation of the container 1, the screws properly located in the slot 28 will be propelled along the slot by rotation of the cylinder and under the influence of gravity and at last the screws will arrive at the aperture 29 which has a width so as to permit also the heads 31 of the screws to pass into the guiding tube 24 the internal diameter of which corresponds to the width of the aperture 29. Accordingly, when a screw reaches the aperture 29 it will slip through the aperture and continue down through the tubes 24 and 25.

Figure 3:
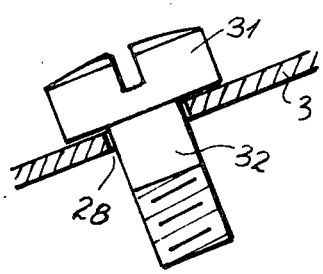
FIG. 3 shows a side sectional view on an increased scale for illustrating the guiding of an article in a slot provided in the bottom of the container shown in FIG. 2.

From FIG. 3 it will readily be understood that the position of the screw shown with respect to the slot 28 is the only stable position in which the screw can remain for the time it takes for the screw to slide along the slot until the screw drops through the enlarged aperture 29. It will also readily be understood that in case the tube 25 is blocked at the lower end, viz. at the working station 27 at which the screws are to be dispensed the result will be that the entire chute or channel formed by the tubes 24 and 25 will be filled with screws positioned end towards end and all of the screws with their heads oriented in the same direction. It will also readily be understood that in the very simple embodiment of the apparatus the tubes 24 and 25 may be simple cylindrical tubes having an internal diameter slightly larger than the diameter of the head of the screws whereas for other articles having a shape which is not formed as a surface of revolution, the cross section of the aperture 29 and of the tubes 24 and 25 may be different depending upon the shape of the articles to be guided through the aperture and the tubes. Moreover, it will be readily understood how the relative motion of the tubes 24 and 25 may be utilized to achieve a predetermined angular position of the articles with respect to the lower tube 25 in case such predetermined angular position is not ensured before the articles pass through the central aperture 29. For instance, the aperture 29 and the tube 24 secured to the bottom wall 3 may have an oblong cross section form in order to guide articles having a corresponding form. The stationary tube 25 may have a corresponding cross section form and will, accordingly, receive articles from the tube 24 only when the latter occupies an angular position at which the cross section form of the tube 24 corresponds to the angular position of the tube 25.

I claim:

1. Apparatus for orienting and dispensing articles comprising a container for accomodating the articles to be oriented and dispensed, said container comprising a bottom wall wherein slot means are provided, said slot means extending from the outer area of the bottom wall and to the center area of the bottom wall and being curved so that the radii of curvature of said slot means decreases in direction from said outer area to said center area, an aperture being provided in said bottom wall at the center area of said bottom wall, said aperture having a width greater than the width of said slot means, said slot means being in communication with said aperture and chute means being connected to said aperture so as to receive articles fed by said slot means to said aperture and to guide said articles to a working station, said container being supported by bearing means for rotation of said container bottom wall about an axis which forms an acute angle with the vertical direction and driving means for unidirectionally rotating said container.

2. Apparatus according to claim 1, wherein said slot means comprise a single slot having spiral like form between the outer area and the center area of the bottom wall.

3. Apparatus according to claim 1, wherein said container bottom is flat and extends along a plane perpendicular to said axis of rotation.

4. Apparatus according to claim 1, wherein the chute means comprise two guiding tubes, one of which is secured to said bottom wall in communication with said aperture, and the other of which is stationarily supported in the apparatus.

* * * * *